United States Patent [19]

Meche et al.

[11] Patent Number: 5,600,708
[45] Date of Patent: Feb. 4, 1997

[54] OVER THE AIR LOCKING OF USER IDENTITY MODULES FOR MOBILE TELEPHONES

[75] Inventors: Paul S. Meche, Richardson, Tex.; Ahti Vaisanen, Del Mar, Calif.

[73] Assignee: Nokia Mobile Phones Limited, Salo, Finland

[21] Appl. No.: 511,519

[22] Filed: Aug. 4, 1995

[51] Int. Cl.$^6$ .................. H04Q 7/30; H04Q 7/32
[52] U.S. Cl. .................. 379/59; 379/58; 455/33.1
[58] Field of Search .................. 379/58, 59, 62, 379/91; 455/33.1; 380/23

[56] References Cited

U.S. PATENT DOCUMENTS

| | | | |
|---|---|---|---|
| 5,121,126 | 6/1992 | Clagett | 342/419 |
| 5,266,782 | 11/1993 | Alanara et al. | 235/380 |
| 5,335,278 | 8/1994 | Matchett et al. | 380/23 |
| 5,420,910 | 5/1995 | Rudokas et al. | 379/59 |
| 5,444,764 | 8/1995 | Galecki | 379/58 |
| 5,467,382 | 11/1995 | Schorman | 379/58 |
| 5,497,411 | 5/1996 | Pellerin | 379/59 |
| 5,537,474 | 7/1996 | Brown et al. | 380/23 |

FOREIGN PATENT DOCUMENTS

0562890A1  3/1993  European Pat. Off. .

Primary Examiner—Dwayne D. Bost
Assistant Examiner—Nay Aung Maung
Attorney, Agent, or Firm—Perman & Green

[57] ABSTRACT

A mobile telephone network in which user identify module (UIM) locking is activated automatically by the network via signalling over the base station to mobile telephone common air interface. The telephone network periodically or regularly queries the Internal Mobile Equipment Identity (IMEI) of the mobile telephone being used by subscribers on the system, If the IMEI of a mobile telephone is found on a 'stolen list' the network may then command the mobile station to activate UIM locking by messaging to and from the mobile telephone over the air interface to activate the UIM locking function using a transmitted bit pattern.

18 Claims, 6 Drawing Sheets

SECURITY REQUEST

| MOBILITY MANAGEMENT PROTOCOL DISCRIMINATOR |
|---|
| SKIP INDICATOR |
| SECURITY REQUEST MESSAGE TYPE |
| TYPE OF SECURITY SIGNAL |
| AUTHENTICATION PARAMETER RAND |
| AUTHENTICATION PARAMETER SRES |

FIG. 5a

SECURITY RESPONSE

| MOBILITY MANAGEMENT PROTOCOL DISCRIMINATOR |
|---|
| SKIP INDICATOR |
| SECURITY RESPONSE MESSAGE TYPE |
| TYPE OF SECURITY REQUEST |
| RESULT CODE |

OVER THE AIR LOCKING OF USER IDENTITY MODULES FOR MOBILE TELEPHONES

BACKGROUND OF THE INVENTION

1. Field of the Invention

The present invention relates to a mobile terminal for telecommunications, for example a portable telephone, and to a communications network making use of such terminals. More particularly, the present invention relates to portable telephones employing user identity modules (UIMs).

2. Description of the Background Art

Portable telephone systems are known that contain a subscriber or user identity feature wherein the telephone can be manually locked to a user identity module (UIM).

European Patent application number 93302420.0, publication number 0562890A1 to Green entitled MOBILE COMMUNICATION NETWORK WITH REMOTE UPDATING OF SUBSCRIBER IDENTITY MODULES IN MOBILE TERMINALS, filed Mar. 29, 1993 discloses a communications network that has a switching network including a mobile switching center which communicates, by radio telephone, with a mobile telephone. The mobile equipment contains a subscriber identity module which stores data for controlling the operation of, and the facilities available to the user, of the mobile equipment. The switching network transmits updating signals to the mobile equipment which alter the data stored in the subscriber identity module and hence alter the operation on facilities available.

The referenced application describes a technique for programming a UIM over the air, but not a method or structure for programming the telephone as described in 0562890A1.

SUMMARY OF THE INVENTION

At present, mobile telephones, particularly those based on the Groupe Speciale Mobile (GSM) Standards, contain an electronic module, previously known as a subscriber identity module or SIM and which is now called a user identity module (UIM). The UIM stores data to be used by the mobile telephone, also referred to herein as a mobile terminal (MT). The UIM is pre-configured to contain a unique identifier for a particular user, and may also contain appropriate authentication functions. The UIM is also able to store temporary data such as paging messages and a telephone number directory.

In current GSM based systems, the subscriber identity is not related to the mobile terminal (MT). This is accomplished by the use of the UIM. The UIM is a module, or smart card, that installs in the phone and has a unique user identity information.

GSM based systems allow a user to insert his UIM card into any mobile terminal and be recognized by the GSM network via information on the UIM rather than information associated with the particular terminal in use. In this system the mobile is identifiable by an IMEI (International Mobile Equipment Identity); however, queries to check this information are 'expensive' in terms of processing and are not normally verified on a per call bases.

These factors have been exploited by thieves who have developed an extensive 'black market' in terminal using GSM based interfaces and has resulted in hundreds of thousands of mobiles being stolen each year.

The present invention reduces the value of a stolen mobile, once detected, by "locking" the mobile terminal to the UIM card in use in the mobile terminal at the time of detection, if any. Locking the mobile to a specific UIM means that the mobile cannot be used with any other UIM and thus diminishes its re-sale value. Additionally, this procedure is coupled with information collection about the UIM being used in the stolen mobile for follow-up by the proper authorities to recover the mobile.

In general, lock function commonly has a four to eight digit pin code and, if activated, must be entered each time the mobile terminal is powered up before any operations can be performed.

Also, mobile terminals also provide a UIM lock designed to prevent the mobile station from accepting unauthorized UIMs without a master password. If activated, the mobile station will only accept previously authorized UIMs.

An object of the present invention is to provide a mobile telephone system wherein UIM locking and unlocking is activated automatically by the network via signalling over the BTS to mobile station common air interface.

Another object of the present invention is to provide a mobile telephone system that allows for the option of locking the UIM to the mobile telephone such that the UIM can only be used with the specific associated mobile telephone.

Still another object of the present invention is to provide a mobile telephone system that allows for the option of locking the mobile telephone to the UIM such that the mobile telephone can only be used with the specific UIM.

Other and further features, advantages and benefits of the invention will become apparent in the following description taken in conjunction with the following drawings. It is to be understood that the forgoing general description and the following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

DETAILED DESCRIPTION OF THE PREFERRED EMBODIMENT

Currently, GSM mobile terminals are easily reused after being stolen simply by inserting a valid UIM card if the legitimate owner forgot or neglected to 'lock' his mobile to his UIM. Additionally, since rental units would normally not locked to a specific UIM card, these mobile terminals are particularly vulnerable to theft. Due to these facts there is a flourishing market in stolen GSM mobile terminals. The present invention defines a mechanism and method by which a mobile terminal which has been determined to be stolen can be locked to the UIM inserted in the unit and thereby be made less valuable in terms of re-sale.

The mobile terminal (MT) of the present invention is locked to the UIM by an over-the-air command. Additionally, the present invention provides a system wherein a UIM inserted in a mobile terminal can be locked to the mobile terminal's IMEI, thereby making the UIM usable only in the mobile terminal it is locked to.

More particularly the telephone network periodically or regularly queries the IMEI of the mobile being used by subscribers on the system. If the IMEI of a mobile is found on a 'stolen list' the network may then command the mobile station to activate UIM locking by messaging to and from the mobile terminal over the air interface to activate the UIM locking function using a transmitted bit pattern.

A communications network typically includes a mobile switching center (MSC) that communicates, such as by radio telephony, with mobile terminals (MT) such as a mobile telephone. The mobile terminal contains a subscriber, or user identity module that stores data for controlling the operation of and the facilities available to the user of the mobile terminal.

In accordance with the present invention, the switching network transmits updating signals to the mobile terminal that alters the data and security status of the mobile terminal and/or the security status of the user identity module.

Figure 1:
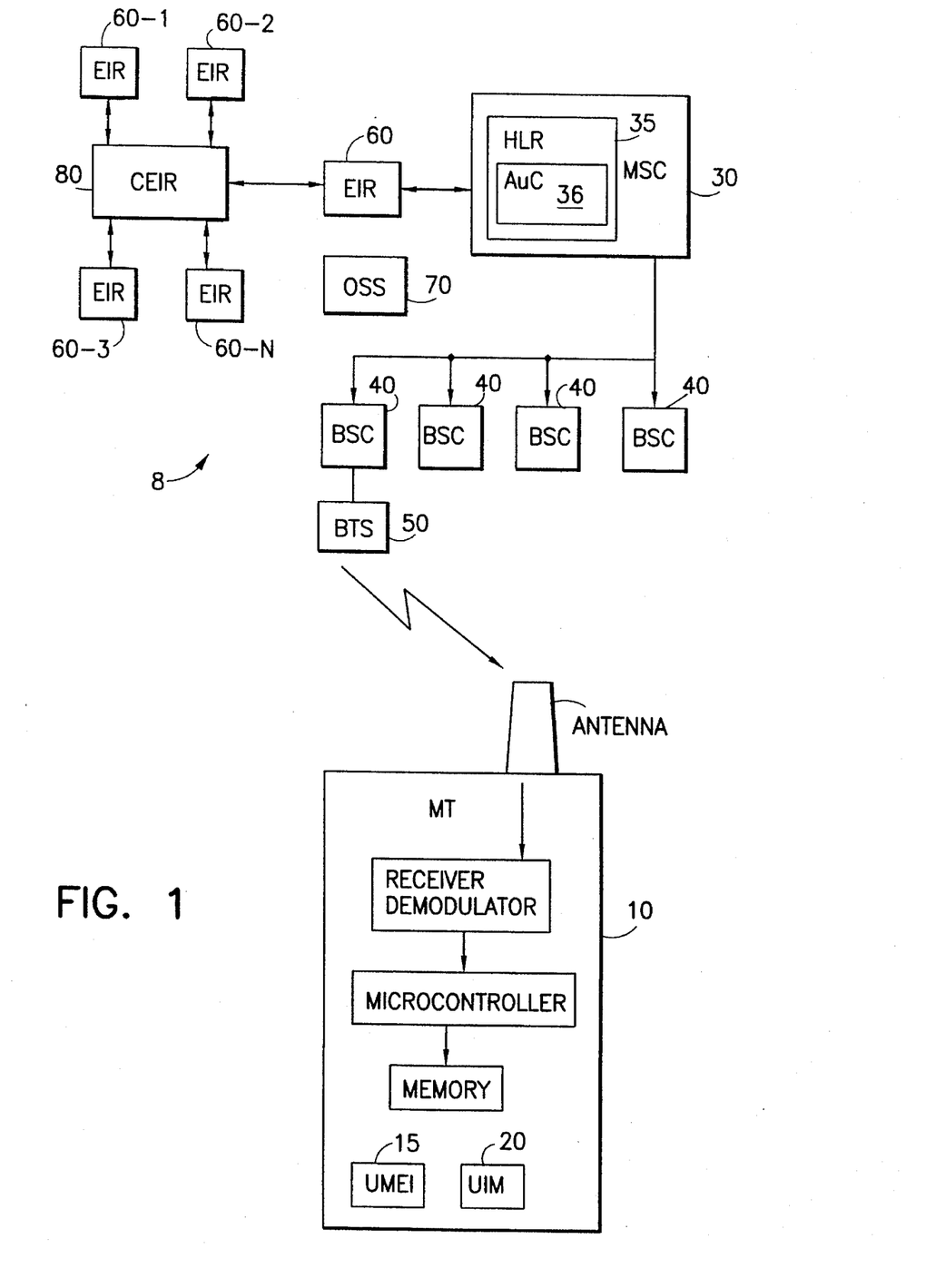
FIG. 1 is a schematic block diagram illustrating one embodiment of a communications network of the present invention.

Referring to FIG. 1, a communications network is shown including a mobile terminal (MT) 10 such as a mobile telephone and a switching network 8 containing mobile switching (MSC) center 30, a number of base station controllers (BSC) 40 for different cell sites in which the mobile terminal 10 can operate an equipment identity register (EIR) 60 is connected to a common equipment identity register (CEIR) 80 which may be connected to other equipment identity registers 60-1, 60-2, 60-N associated with other switching networks and their associated mobile terminals. An operation sub-system (OSS) 70 may be provided to update the equipment identity register 60. Communication over the air to and from mobile terminals such as mobile terminal 10 is carried out via a base station transceiver unit (BTS) 50.

Each mobile terminal in the communications network such as mobile terminal 10 includes a user identity module (UIM) 20 that stores pre-programmed data unique to a particular user and an international mobile equipment identity unit (IMEI) 15. Each international mobile equipment identity 15 is unique to its mobile terminal 10 and is used to identify the mobile terminal 10 to the mobile switching center 30.

In FIG. 1, normal communication occurs between the communications network from the MSC 30 to a mobile telephone or other mobile terminal MT 10 via one of many base station controllers BSC 40 over one of its associated base transceiver systems BTS 50.

The MT 10 contains a user identity module UIM 20 which stores a unique identifier of a specific user as well as any available authentication functions for that user. The MT 10 also contains a unique international mobile equipment identity IMEI 15.

The MSC 30 contains or has communication channels to access the home location register HLR 35 for a specific user. The HLR 35 contains a functional subdivision known as the authentication center AuC 36 which manages the security data used for the authentication of users. Together, the AuC 36 functions of the HLR 35 and the corresponding authentication functions in the UIM 20 provide a relatively secure and robust means to validate or authenticate a user and thus prevent various types of fraudulent use.

The MSC 30 has communications channels to access an equipment identity register EIR 60 which is a database which contains information regarding the validity and status of mobile equipment MT 10 via their international mobile equipment identifiers IMEI 15 known to the communication network. The EIR 60 contains three 'lists'. One is the 'white list' which includes the range of valid type-approved mobile equipment MT 10. Another is the 'black list' which includes the list of IMEI 15 which have been reported as either stolen or having severe malfunctions. The third list, 'grey list' is an intermediate between 'white' and 'black' which includes suspect units before authorities confirm black listing.

Figure 2:
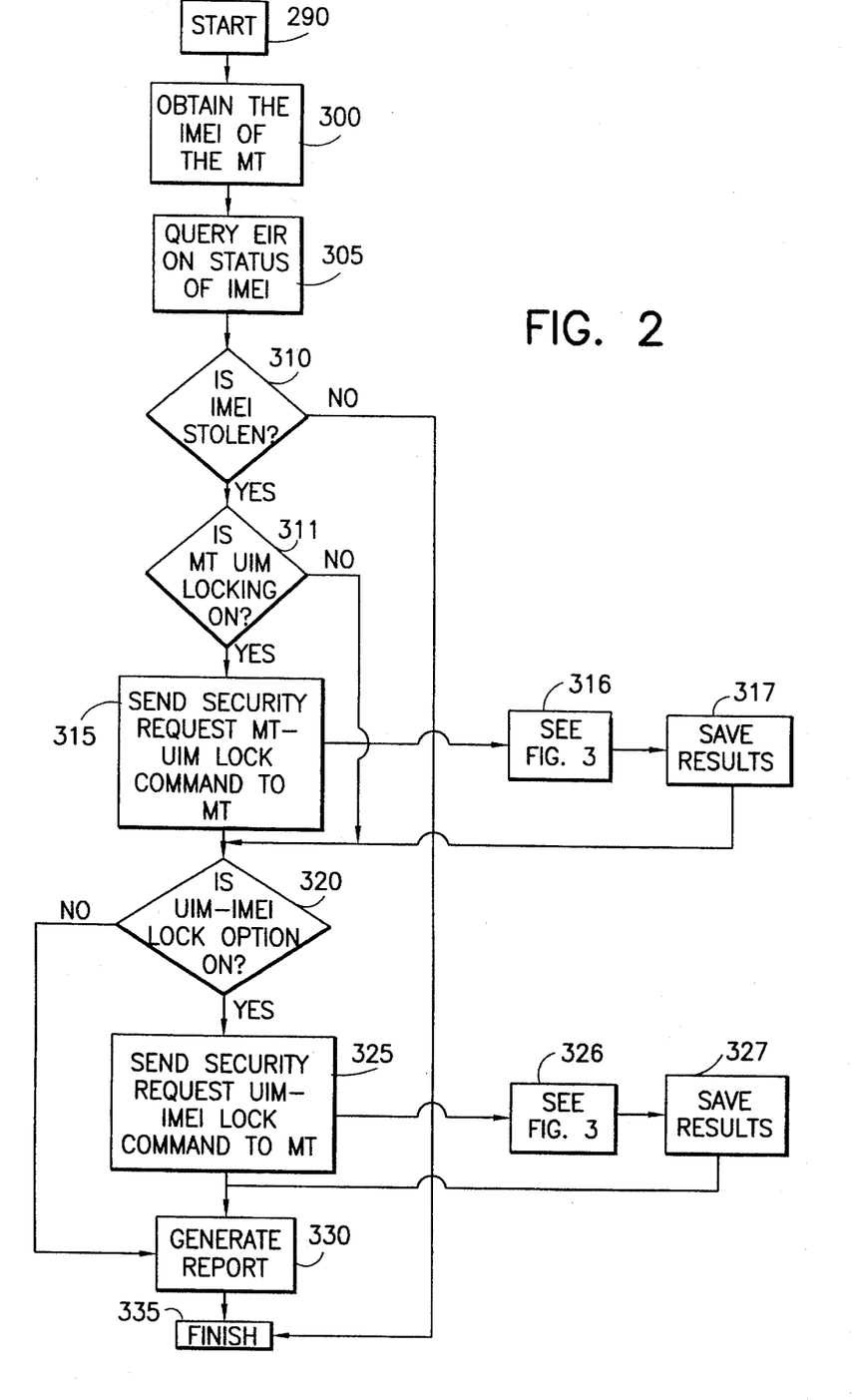
FIG. 2 shows a flow chart of the network logic, MSC 30 of FIG. 1, for the processing of messages according to a method of the present invention.

The steps of the process of the present invention as shown in the blocks of FIG. 2. At the start of communications between the MT 10 and the MSC 30 various obligatory messaging sequences are exchanged which are common knowledge to one skilled in the art. After this conventional messaging the MSC 30 is required to obtain the IMEI 15 of the MT 10 as indicated in FIG. 2 block 300. In conventional systems this is accomplished by the transmission of IDENTITY REQUEST Message to the MT 10. The conventional MT 10 responds with IDENTITY RESPONSE Message which contains the IMEI 15. One of the features of the present invention is the optimization of this messaging exchange by including the IMEI 15 information in the conventional obligatory messages noted earlier. Specifically in the preferred embodiment of this invention the IMEI 15 information is packaged in the LOCATION UPDATING REQUEST message from the MT 10.

The format and structure of the LOCATION UPDATING REQUEST in conventional systems may only carry the IMEI if the MT 10 does not contain an UIM 20 or the UIM 20 is considered invalid for some reason. It is the subject of the optimization aspects of this invention to always include the IMEI in the LOCATION UPDATING REQUEST whether or not a TMSI or IMSI is also included in this message. In those cases where a TMSI or IMSI is also included in the LOCATION UPDATING REQUEST, the message shall contain two MOBILE IDENTITY information element one for TMSI or IMSI and one for IMEI. In those cases where the LOCATION UPDATING REQUEST contains only the IMEI the message shall be identical to the conventional LOCATION UPDATING REQUEST used in today's systems.

Regardless of how the IMEI 15 is obtained, via MSC 30 explicit IDENTITY REQUEST sequence or automatically via the preferred enhancement of the LOCATION UPDATING REQUEST or other conventional obligatory message, the MSC 30 queries the EIR 60 at block 305 of FIG. 2 to determine the status of the IMEI 15 reported from the MT 10. If the EIR 60 indicates that the IMEI 15 is included in the 'black list' as a stolen mobile or as a unit with severe malfunction at block 310 control flows to block 311 where the MSC 30 determines if the MT-UIM Locking function is enabled. If the EIR 60 query indicated that the mobile terminal was not stolen or 'black listed' in block 310, control branches to block 335 and the process is finished.

The MT-UIM Locking function will normally be enabled, but may be disabled for a particular MSC 30 if its operator so desires. If the function is enabled in block 311 branching at block 311 passes to block 315. If MT-UIM Locking function is disabled branching at block 311 passes to block 320.

When control is passed to block 315 the MSC 30 constructs a SECURITY REQUEST MESSAGE indicating an MT-UIM LOCK command (FIG. 5a) and transmits this message via the BSC 40 and BTS 50 units in communication with the MT 10 illustrated in FIG. 1. In the preferred embodiment of the invention all SECURITY REQUEST messages are transmitted enciphered mode.

The SECURITY REQUEST MESSAGE indicating MT-UIM LOCK command contains a RAND and SRES pair provided via the AuC 36 function of the HLR 35 associated with the user UIM 20 in order to provide the MT 10 with a means to ensure that the command is valid and not the result of unauthorized mischief or 'hacking'. Control flow from block 315 continues to block 316. In block 316 the MSC 30 is expecting a response from the MT IO.

Figure 3:
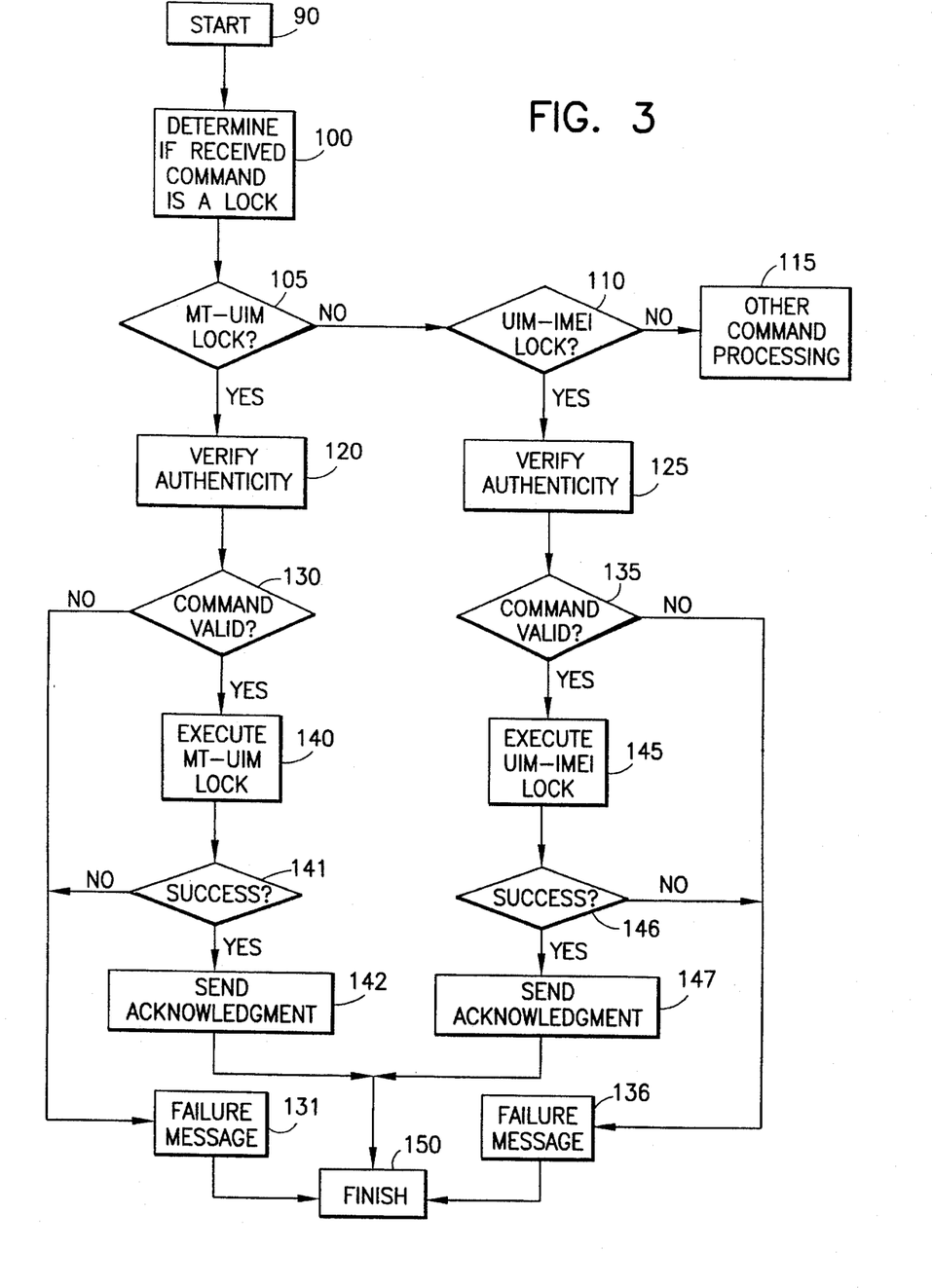
FIG. 3 shows a flow chart of the mobile terminal logic, MT 10 of FIG. 1, for the processing of messages according to a method of the present invention.

FIG. 3 outlines the mobile equipment logic MT 10 associated with the invention. When a message is received from the MSC 20, the MT 10 must determine if the message received represents a command to activate one of the newly defined LOCKs step 100. First check preferred is identified in step 105 as the check to see if the message is a SECURITY REQUEST MESSAGE INDICATING MT-UIM lock. If the message contains such a command, control flow branches form 105 to step 120. If the message is not a MT-UIM LOCK, control flow branches from step 105 to step 110.

Mobile equipment MT 10 processing from steps 110 onwards will be discussed following the MSC 30 logic associated with UIM-IMEI locking step 325 of FIG. 2.

In step 120 of FIG. 3 the MT 10 must verify that the message received is authorized. This is done by utilizing conventional authentication procedures in the UIM 20 combined with new procedures in the MT 10 to execute the function. As noted in FIG. 5a, the MT-UIM LOCK message contains the RAND from the AuC 36, which is well known to one skilled in the art. In order to harden this procedure, the preferred embodiment of this invention will place additional requirement on the RAND to protect against hacking. These requirements should be well considered and specific to a particular implementation. The preferred method of hardening recommended is to have the MT 10 construct an AUTHENTICATION REQUEST with a randomly chosen RAND and transmit this request to the MSC 30. The MSC 30 would then send the RAND received from the MT 10 to the appropriate HLR 35 AuC 36 function and receive the correct SRES response. The MSC 30 would then construct an AUTHENTICATION RESPONSE message containing said SRES and transmit to the MT 10. The MT 10 would then compare the SRES received in the AUTHENTICATION RESPONSE from the MSC 30 to an SRES that UIM 20 calculated using the RAND originally sent to the MSC 30 in the AUTHENTICATION REQUEST message. If these two SRES values match, the SECURITY REQUEST is considered authentic. This method requires the MSC 30 and AuC 36 modified to support the messaging exchanges noted which are readily understood by one skilled in the art. Another example, of hardening considered could be to maintain a list of sufficient length of previously received RAND and checking the RAND received in the message against this list. If the RAND is found in the list maintained, and one considers the probability of such a match unlikely the message may be discarded and control flow branches to step 131. This type of procedure may be combined with other procedures such as monitoring the frequency that various messages containing RAND are received; however, specifically identifying any method of additional hardening would only serve to provide 'hackers' with information which they should be denied. If the RAND passes the recommended hardening techniques chosen for the particular MT 10 implementation, the MT 10 proceeds with authentication process. The RAND is sent to the UIM 20 via conventional means and the UIM 20 returns an SRES value calculated in the conventional fashion by UIM 20 authentication logic. In step 130 the MT 10 then compares the SRES received in the MT-UIM LOCK messages from MSC 30 to the SRES calculated by the UIM 20. If the two SRES values are identical, MT-UIM LOCK command is considered authentic and authorized and control flow branches from step 130 to step 140. If authentication fails in step 130, control flow branches to step 131.

In step 140 the MT 10 executes internal UIM locking procedures that modify the MT 10 processing to only accept the UIM 20 card that is currently installed in the MT 10 UIM locking procedures are unique to the hardware and software design of the MT 10 in question are must be closely guarded to ensure the security of this function against 'hacking' or other fraud. UIM locking procedures for a specific MT 10 design are well known to those skilled in the art and application to a specific MT 10 design but never disclosed due to the security risk of such disclosure. Control flows from step 140 to step 141 where the MT 10 determines if the MT-UIM LOCKING procedure was successful, if so control flow branches to step 142 and if not to step 131.

In step 142 the MT 10 has verified that is has locked to the UIM 20 in question and therefore constructs a SECURITY RESPONSE (FIG. 5b) indicating the MT-UIM LOCK was successful. This message is transmitted to the MSC 30. Control flow falls to step 150 and the process is finished.

Step 131 constructs a SECURITY RESPONSE indicating the MT-UIM lock operation failed and the failure reason. This message is then transmitted to the MSC 30 and indicates the failure reason as either authentication failure or other processing failure. Control flow then falls to step 150 and the process is finished.

Having explored the control flow of MT 10, reference is now made to FIG. 2 step 316 and where the discussion regarding the MSC 30 control flow was left. The MSC 30, having received a response or timing out on a response from MT 10 has its control flows from step 316 to step 317 where the MSC 30 stored the information regarding the results of the MT-UIM LOCK operation from the MT 10 for future reference by step 330. Then control flows from step 317 to step 320.

In block 320 the MSC 30 determines whether UIM-IMEI Locking function is enabled. The conditions for determining if this function is enable will vary greatly depending on regulatory issues, operator preference and other factors therefore, a 'normal' mode of operation is not expected for this function, it is completely at operator preference; however, if the function is enabled control flow branches from block 320 to block 325. If the function is disabled control flow branches from block 320 to block 330.

In block 325, the MSC 30 constructs a SECURITY REQUEST indicating a UIM-IMEI LOCK command and transmits this message to the MT 10. Like the MT-UIM LOCK command, the UIM-IMEI LOCK command contains a RAND and SRES pair from the AuC 36 function associated with the UIM 20 as a means to authenticate the operation. Control flow from block 325 proceeds to block 330.

The MSC 30 control flows from step 325 to step 326 where the MSC 30 effectively waits for a response or will timeout waiting on a response for MT 10, thus will now focus on the MT 10 processing noted in FIG. 3.

As noted previously, when the MT 10 receives a message from MSC 30, the control flows through step 100 to 105. If in step 105 the message received did not indicate an MT-UIM lock command control flows from step 105 to step 110.

Step 110 test the contents of the received message to determine if it contains a UIM-IMEI LOCK command. If so, control branches from step 110 to step 125. If not, control flow branches from step 110 to step 115.

Step 115 represents the processing of other commands received from MSC 30 which are not of interest to the present invention and therefore we can consider processing within the scope of this invention to be finished.

Figure 5A:
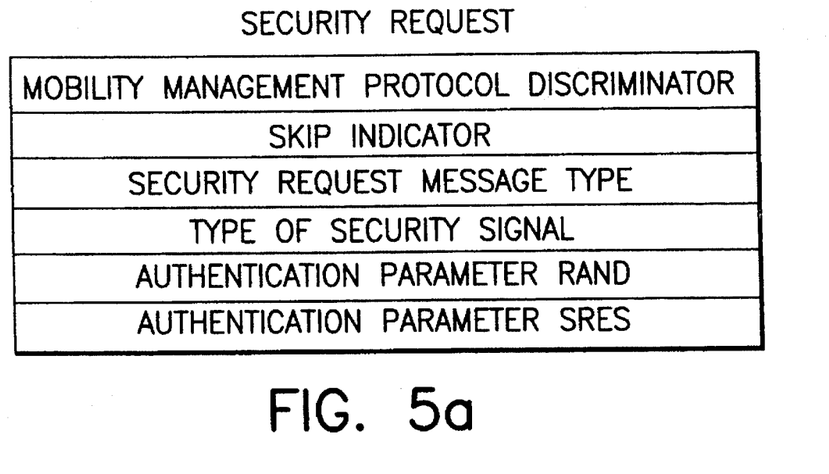
FIGS. 5a and 5b show the structure of messages which may be used in the invention.

Step 125 is responsible for ensuring the authenticity of the received UIM-IMEI LOCK command. As indicated in FIG. 5a, the SECURITY REQUEST indicating UIM-IMEI LOCK command contains the RAND and SRES calculated for the UIM 20 in question by the AuC 36 associated with this UIM 20. As noted in the discussion of FIG. 3, step 120, the preferred embodiments will have additional hardening requirements placed on the RAND by the MT 10. These hardening requirement may be intentionally different from those chosen in step 120 or identical depending on implementors decision. If the hardened RAND requirements do not pass the MT 10 declares the command invalid in step 135 and branches to step 136. Otherwise the UIM-IMEI LOCK command is transferred from the MT 10 to the UIM 20 complete with both the RAND and the SRES contained in the message received from the MSC 30 for further processing. Control flow then proceeds from step 135 to step 145.

In step 145 the MT 10 transmits the UIM-IMEI LOCK message to the UIM 20 and waits for the results of the operation or timeout.

Figure 4:
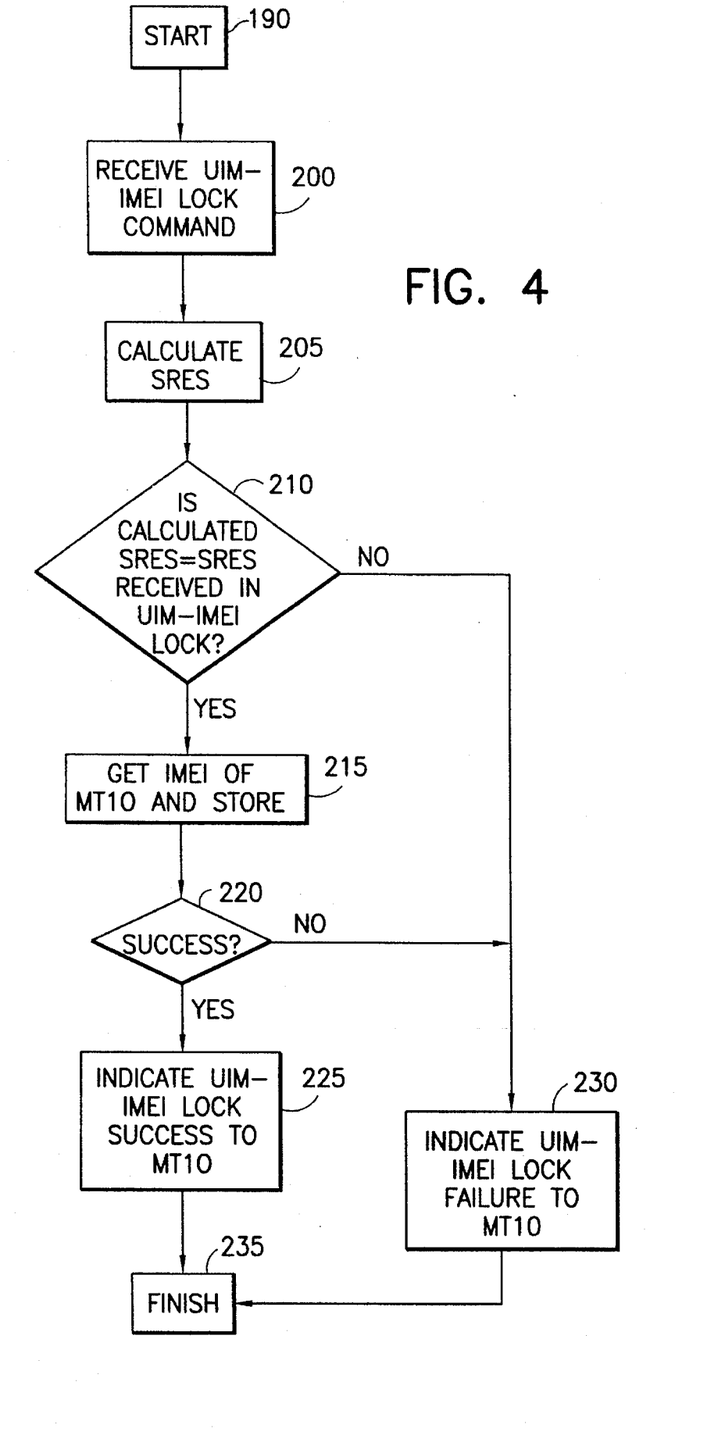
FIG. 4 shows a flow chart of the user interface module logic, UIM 20 of FIG. 1, for the processing of messages incorporating the invention.

FIG. 4 indicates the control flow within the UIM 20 for the processing of the UIM-IMEI LOCK command. The process is initiated by the receipt of the UIM-IMEI LOCK command from the MT 10 step 145 which results in step 200 of FIG. 4 UIM 20. Control flows from step 200 to step 205 where the UIM extracts the RAND contained in the UIM-IMEI LOCK message and calculates SRES in the conventional fashion. Once the UIM 20 has calculated SRES in step 205 control flows into step 210 where the UIM 20 calculated SRES is compared to the SRES contained in the UIM-IMEI LOCK message from MSC 30. If the two SRES values are identical, control branches from step 210 to step 215. If the two SRES values are not identical, control branches from step 210 to step 230.

In step 215 the UIM 20 request the IMEI 15 from the MT 10. The IMEI 15 value is stored in the UIM 20 for future reference in every initialization cycle, etc. Control flows from step 215 step 220 where success of step 215 is tested. If the operation completed successfully, control flows from step 220 to step 225. If not, control branches from step 220 to step 230.

Step 225 stores the fact that the UIM is now successfully locked to a specific IMEI 15 by storing an indicator of this fact on the UIM 20. Additionally, the UIM 20 indicates to the MT 10 that the UIM-IMEI LOCK command has been successfully executed. Control flows from step 225 to step 235 and the process is finished.

Step 230 sends an indication to the MT 10 that the UIM-IMEI LOCK operation in step 145 (or timeout) and proceeds to step 146 where if the operation was successful, MT 10 control branches from step 146 to step 147. If not, control branches from step 146 to step 136.

In step 147 the MT 10 constructs a SECURITY RESPONSE indicating the UIM-IMEI LOCK was successful and transmits this message to the MSC 30. Control in the MT 10 then flows from step 147 to step 150 and the MT 10 process is complete.

In step 136 the MT 10 constructs a SECURITY RESPONSE indicating UIM-IMEI LOCK failure and transmits this message to MSC 30. Control in MT 10 then flows from step 136 to step 150 and the MT 10 process is complete.

In step 136 the MT 10 constructs a SECURITY RESPONSE indicating UIM-IMEI LOCK failure and transmits this message to MSC 30. Control in MT 10 then flows from step 136 to step 150 and the MT 10 process is complete.

Referring now to FIG. 2, control flow from step 326 proceeds to step 327 as the MSC 30 has received a response from the MT 10. In step 327 MSC 30 stores the results reported from the MT 10 for reference in step 330. The control then flows from step 327 to step 330.

Block 330 handles the processing of administrative reports. In the preferred embodiment, these reports will contain the IMEI 15 of the MT 10 in question, the status associated with the IMEI 15 from the EIR 60, information regarding the user associated with the UIM 20 contained in the MT 10 and the action take by the MSC 30 which, depending on the branches taken, may include: Report Only, MTA-UIM LOCK (success/failure/not attempted), UIM-IMEI LOCK (success/failure/not attempted) as well as the results of MT 10 locking operations if applicable. These reports would eventually forwarded to the proper authorities for possible criminal investigations, etc.

Figure 6:
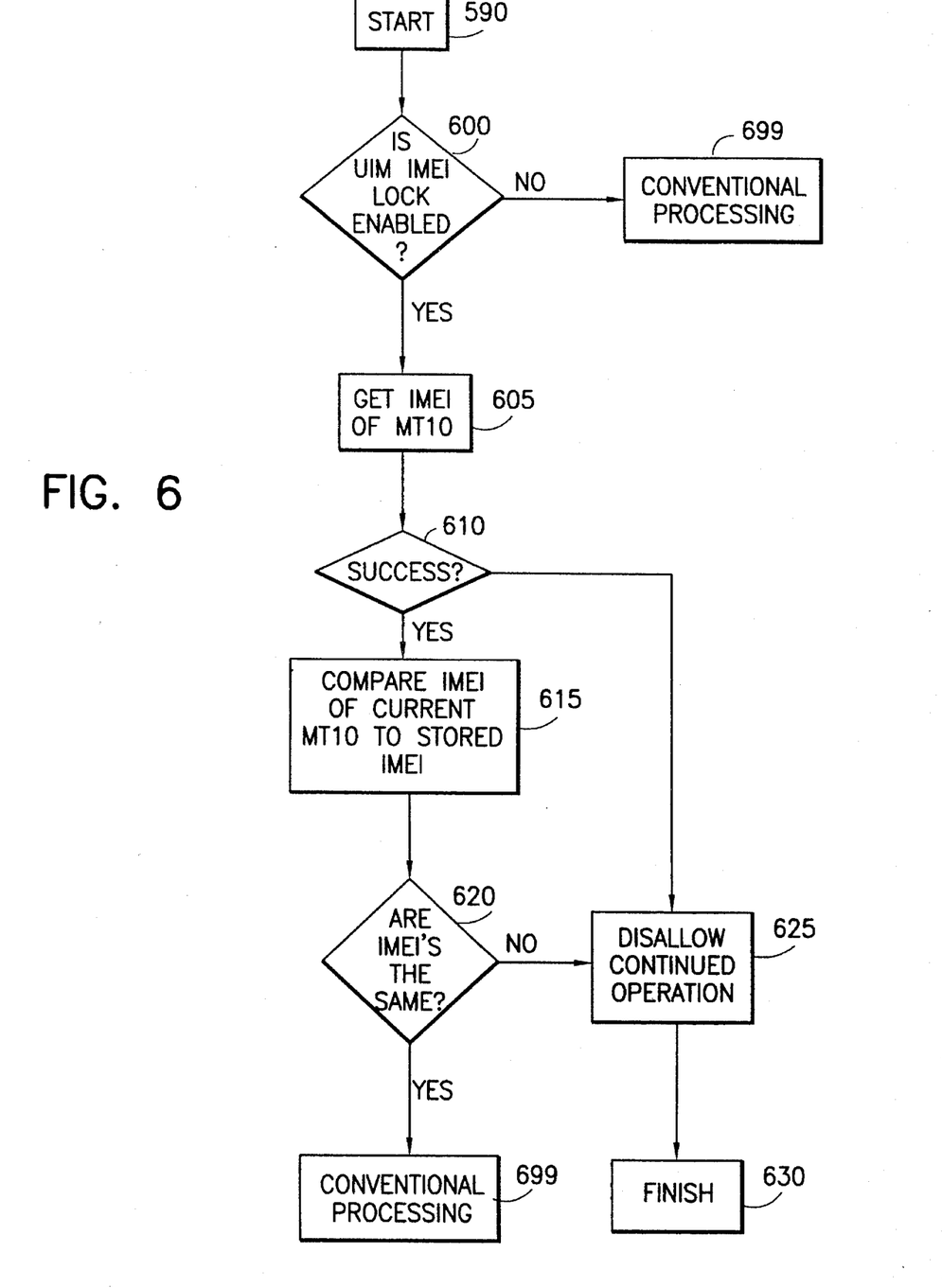
FIG. 6 shows a flow chart for initialization logic required in the UIM 20 of FIG. 1 to carry out the UIM-IMEI locking in the embodiment of the present invention.

In step 605 the UIM 20 request the IMEI 15 of the current MT 10. Control flows from step 605 to 610 where the success of the IMEI query operation of step 605 is checked. If the IMEI 15 of the current MT 10 is received, control branches from step 610 to step 615. If not, control branches from step 605 to step 625.

Step 615 compares the IMEI 15 received from the current MT 10 to the IMEI 15 stored on the UIM 20 in step 215 of FIG. 4. If the two IMEI values are identical, control flow branches from step 620 to step 699 where conventional processing continues and the process is finished with respect to the current invention. If the two IMEI values are not identical, control branches from step 620 to step 625.

In step 625 the UIM 20 indicates that the initialization process is halted to the MT 10 because the UIM 20 is currently locked to an IMEI 15 that is different from the IMEI 15 received from the current MT 10. Control then flows from step 625 to step 630 and the process is finished.

FIG. 5a is the preferred embodiment of the MSC 30 to MT 10 SECURITY REQUEST message. The message is new; however, several components of the message are conventionally used in the existing system. The new information elements are SECURITY REQUEST MESSAGE TYPE which is an eight bit value which will uniquely identify this message type within the MOBILITY MANAGEMENT set of messages. This value is assigned by standardization bodies any value is acceptable as long as it is unique in the SECURITY MESSAGE range of Mobility management message types. The next new information element is TYPE OF SECURITY REQUEST. The preferred length of this information element is eight bits. One bit is reserved. One bit is used to indicate the lock state requested where 0 signifies 'UNLOCK' and 1 signifies 'LOCK'. One bit to indicate MT-UIM lock and one bit to indicate the UIM-IMEI lock. The rest reserved. The MT-UIM and UIM-IMEI bits could be used as a bit mask such that the MSC 30 could instruct the MT 10 to lock action or unlock both locks via one message; however, the preferred embodiment is only one lock per message for simplicity. Numerous other formats and structures could be employed to realize this invention.

Figure 5B:
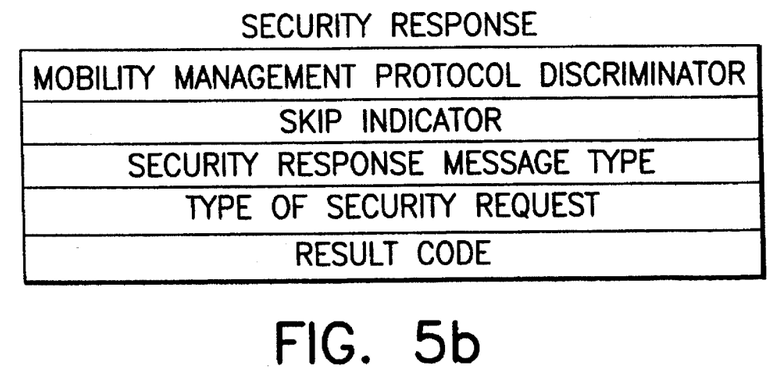

FIG. 5b is the preferred embodiment of the MT 10 to MSC 30 SECURITY RESPONSE. As noted in FIG. 5a several of the information elements are conventional. The SECURITY RESPONSE MESSAGE TYPE is an eight bit value which will uniquely identify this message type within the MOBILITY MANAGEMENT set of messages. This value is assigned by standardization bodies any value is acceptable as long as it is unique in the SECURITY MESSAGE range of Mobility management message types. The TYPE OF SECURITY REQUEST is as described in FIG. 5a. For simplicity, the preferred embodiment is only one lock action per message; however, if there were more than one lock identifier set in the SECURITY RESPONSE message, there would be multiple RESULT CODE information elements, one for each lock identified set (i.e. value 1). The RESULT CODE would map such that the first RESULT CODE IEI corresponds to the lock identified in the least significant bit of the locking bit map, etc. Value of "0" indicates that the operation was successful. The RESULT CODE value of "1" indicates failure because SRES calculated by UIM 20 did not match the SRES in the SECURITY REQUEST. The binary result code of "10" indicates the operation failed due to a time out failure of the preferred hardening technique of sending the authentication request message to the MSC 30. The binary result code of "11" indicates the SRES of the authentication response from MSC 30 was incorrect. All other values represent various types of failures whose meaning is only known to the manufacturer of the MT 10 involved. Numerous other formats and structures could be employed to realize this invention.

FIG. 6 illustrates UIM 20 logic which must be inserted before conventional logic in order to realize the UIM-IMEI LOCK invention. In step 600, as soon as possible in the conventional processing of the UIM 20 and before UIM 20 initialization is complete, the UIM 20 checks its control structures to determine if the UIM 20 is currently locked to a specific IMEI 15 associated with a specific MT 10. If so, control branches from step 600 to step 605. If not, control flow branches from step 600 to step 699 where conventional processing continues and the process is finished with respect to the current invention.

Note that a similar figure for mobile equipment MT 10 initialization processing could be provided; however, since MT 10 to UIM 20 locking currently exist via different activation methods this information is well known to those skilled in the art and is not described herein.

It is also an object of the present invention to support the unlocking of both the MT-UIM and UIM-IMEI functions via messages. To one skilled in the art, the format of the SECURITY REQUEST message supports this via the 'UNLOCK' bit discussed in FIG. 5a. The logic and control flows for the unlock operations are obvious when considering FIGS. 3 and 4. The logical unlock operation for MSC 30 is much the same as the lock operations except the triggers in FIG. 2, step 310 may be the 'white listing' of a previously 'black listed' MT 10 or manual interaction via an operator's technician and various MSC 30 interfaces to force the transmission of the appropriate unlock command(s). The preferred embodiment supports both the 'batch' type process of 'black listed' transition to 'white listed' and manual intervention.

While a preferred embodiment of the invention has been disclosed in detail, it should be understood by those skilled in the art that various other modifications may be made to the illustrated embodiment without departing from the scope of the invention as described in the specification and defined in the appended claims.

We claim:

1. A mobile communications network comprising at least one central base switching network and a plurality of remote mobile terminals containing circuits for transmitting and receiving electronic signals, each of said remote mobile terminals including a user identity module (UIM) containing personalized user data for controlling the transmission of signals therefrom, wherein said central base switching network includes means for transmitting data signals to a selected remote mobile terminal for selectively locking said selected remote mobile terminal to said included UIM and said included UIM to said selected remote mobile terminal, thereby selectively preventing operation of said selected remote mobile terminal with any other of said UIMs and operation of said included UIM with any other of said remote mobile terminals.

2. A mobile communications network according to claim 1 wherein said central base switching network includes means for transmitting data signals to a selected remote mobile terminal for locking said selected remote terminal to said included UIM, thereby preventing operation of said selected remote mobile terminal with any other of said UIMs.

3. A mobile communications network according to claim 1 wherein said central base switching network includes means for transmitting data signals to a selected remote mobile terminal for locking said included UIM to said selected remote terminal thereby preventing operation of said included UIM with any other of said remote mobile terminals.

4. A mobile communications network according to claim 1 wherein each UIM in each of said remote mobile terminals includes a storage means for storing said personalized user data.

5. A mobile communications network according to claim 1 wherein each UIM in each of said remote mobile terminals includes means responsive to said data signals transmitted from said central base switching network for preventing operation of said remote mobile terminal with any other UIM when said transmitted data signal data is the same as said personalized user data stored in said UIM of said remote mobile terminal.

6. A mobile communications network according to claim 1 wherein said remote mobile terminals are cellular telephones.

7. A mobile communications network according to claim 1 wherein each of said remote mobile terminals include a unique international mobile equipment identity (IMEI).

8. A mobile communications network according to claim 1 wherein said central base switching network includes a mobile switching network includes a mobile switching center (MSC) connected to at least one base station control (BSC) and at least one base transceiver system (BTS) for transmitting said data signals to said selected remote mobile terminal.

9. A mobile communications network according to claim 8 wherein said mobile switching center (MSC) includes a home location register (HLR) having an authentication center (AUC), and wherein said mobile switching center (MSC) is connected to an equipment identity register (EIR) containing data regarding the validity and status of said mobile terminals.

10. A method for locking a selected remote mobile terminal of a mobile communications network having at least one central base switching network and a plurality of remote mobile terminals containing circuits for transmitting and receiving electronic signals, each of said remote mobile terminals including a user identity module (UIM) containing personalized user data for controlling the transmission of signals therefrom, comprising the steps of:

step 1. transmitting data signals from said central base switching network to a UIM of a selected remote mobile terminal step 2. receiving said data signals transmitted from said central base switching network and selectively locking said selected mobile remote terminal to said included UIM, and said included UIM to said selected remote mobile terminal, thereby preventing operation of said selected remote mobile terminal with any other UIMs and operation of said included UIM with any other of said remote mobile terminals.

11. A method for locking a selected remote mobile terminal of a mobile communications network according to claim 10 wherein in said included UIM is locked to a said specific remote mobile terminal.

12. A method for locking a selected remote mobile terminal of a mobile communications network according to claim 10 wherein in step 2 said specific remote mobile terminal is locked to said included UIM.

13. A method for locking a selected remote mobile terminal of a mobile communications network according to claim 10 step 2 includes comparing said personalized user data in said UIM to said received data signal from said central base switching network, and locking said UIM and preventing operation of said selected remote module when said received data is the same as said personalized user data.

14. A method for locking a selected remote terminal of a mobile communications network according to claim 13 that further includes authentication procedures contained in said UIM, and wherein step 2 further includes comparing the results of said authentication procedures.

15. A method for a selected remote mobile terminal of a mobile communications network according to claim 10 wherein said step 1 includes the steps of obtaining the international mobile equipment identity (IMEI) of said selected mobile terminal, quering an equipment identity register (EIR) on the status of the international mobile equipment identity to determine if the selected remote mobile terminal is stolen, and transmitting a user identity module lock command to said selected remote mobile terminal.

16. A method for locking a selected remote terminal of a mobile communications network according to claim 15 that further includes authentication procedures contained in said UIM, selected remote mobile terminal and wherein step 2 further includes comparing the results of said authentication procedures.

17. A method for locking a selected remote mobile terminal of a mobile communications network according to claim 10 wherein said step 2 includes determining if a received command transmitted from said central base switching network is a lock command, verifying the authenticity of said lock command, and executing a mobile terminal to user identity module lock.

18. A method for locking a selected remote mobile terminal of a mobile communications network according to claim 17 wherein step 2 further includes sending an acknowledgement from said selected remote mobile terminal to said central base switching network that said selected remote mobile terminal has been locked.

* * * * *